(12) United States Patent
Kim (10) Patent No.: US 9,999,210 B1
(45) Date of Patent: Jun. 19, 2018

(54) MICRO EXTERNAL ADJUSTABLE SPOOL BRAKING SYSTEM

(71) Applicant: W.C. BRADLEY/ZEBCO HOLDINGS, INC., Tulsa, OK (US)

(72) Inventor: Hyunkyu Kim, Broken Arrow, OK (US)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 527 days.

(21) Appl. No.: 14/643,968

(22) Filed: Mar. 10, 2015

(51) Int. Cl.
*A01K 89/01* (2006.01)
*A01K 89/033* (2006.01)

(52) U.S. Cl.
CPC .................. *A01K 89/033* (2013.01)

(58) Field of Classification Search
CPC .......... A01K 89/0155; A01K 89/01555; A01K 89/01557
See application file for complete search history.

(56) References Cited

U.S. PATENT DOCUMENTS

| | | | |
|---|---|---|---|
| 2,482,863 A | 9/1949 | Nelson | |
| 3,986,678 A | 10/1976 | Coquelet et al. | |
| 4,905,930 A | 3/1990 | Puryear et al. | |
| 4,917,321 A | 4/1990 | Roberts | |
| 4,940,194 A * | 7/1990 | Young .............. | A01K 89/01555 188/267 |
| 5,108,042 A | 4/1992 | Puryear et al. | |
| 5,118,049 A | 6/1992 | Roberts et al. | |
| 5,217,182 A | 6/1993 | Puryear et al. | |
| 5,257,753 A | 11/1993 | Sato | |
| 5,301,899 A | 4/1994 | Sato | |
| 5,305,967 A | 4/1994 | Sato | |
| 5,308,021 A | 5/1994 | Ikuta | |
| 5,344,098 A | 9/1994 | Roberts | |
| 5,489,070 A | 2/1996 | Puryear et al. | |
| 5,692,693 A * | 12/1997 | Yamaguchi ...... | A01K 89/01555 242/288 |
| 5,749,534 A * | 5/1998 | Morimoto ........ | A01K 89/01555 188/164 |
| 5,782,420 A | 7/1998 | Forslund et al. | |
| 5,803,385 A | 9/1998 | Baisch | |
| 5,950,949 A * | 9/1999 | Cockerham ........ | A01K 89/0155 188/180 |
| 5,984,221 A | 11/1999 | Kim | |
| 6,003,798 A * | 12/1999 | Kim .................. | A01K 89/0155 188/180 |
| 6,168,106 B1 | 1/2001 | Cockerham | |
| 6,206,311 B1 | 3/2001 | Kim et al. | |

(Continued)

FOREIGN PATENT DOCUMENTS

JP           6-75168           10/1994

*Primary Examiner* — Emmanuel M Marcelo
(74) *Attorney, Agent, or Firm* — Gable Gotwals (57) ABSTRACT

A device has a spool rotatable about an axis in a reel, and a braking structure that effects a braking force against rotation of the spool, the braking force being adjustable by changing a proximity of the braking structure relative to the spool. The device includes at least one tap in a fixed relationship with respect to the braking structure, and a brake dial accessible outside the reel and providing a threaded portion that accepts the at least one tap, the brake dial being rotatable to change the proximity of the braking structure relative to the spool by movement of the tap.

23 Claims, 11 Drawing Sheets

(56) References Cited

U.S. PATENT DOCUMENTS

| | | |
|---|---|---|
| 6,293,483 B1 | 9/2001 | Sato et al. |
| 6,336,605 B1 | 1/2002 | Littau et al. |
| 6,364,230 B1 * | 4/2002 | Kawasaki .......... A01K 89/0155 188/181 A |
| 6,398,141 B1 | 6/2002 | Kim |
| 6,422,498 B1 | 7/2002 | Littau et al. |
| 6,481,657 B1 * | 11/2002 | Oishi ................. A01K 89/0155 242/289 |
| 6,908,054 B1 | 6/2005 | Kim et al. |
| 2005/0178872 A1 * | 8/2005 | Hyun ................. A01K 89/0155 242/611 |
| 2006/0169813 A1 * | 8/2006 | Nakagawa ....... A01K 89/01555 242/288 |
| 2010/0001112 A1 * | 1/2010 | Noh ................... A01K 89/0155 242/289 |
| 2011/0079672 A1 | 4/2011 | Kim et al. |
| 2012/0248233 A1 * | 10/2012 | Saito ................. A01K 89/0155 242/289 |
| 2013/0292504 A1 * | 11/2013 | Hyun ................ A01K 89/0155 242/289 |
| 2013/0306777 A1 * | 11/2013 | Ikebukuro ....... A01K 89/01555 242/288 |

\* cited by examiner

MICRO EXTERNAL ADJUSTABLE SPOOL BRAKING SYSTEM

FIELD OF THE INVENTION

The present disclosure relates to braking systems for fishing reels in general and, more specifically, to adjustment mechanisms for braking systems for fishing reels.

BACKGROUND OF THE INVENTION

Reels with adjustable braking systems are known in the art. Some are based on centrifugally deployed braking elements. Others may utilize magnets to deploy magnetic fields creating a drag to slow metallic components. Various adjustable braking systems may operate by translating or rotating components inside the reel such that more or fewer braking elements interact with brake rings or other components. Magnetic systems may vary the location of magnets relative to metallic components inside the reel to alter the magnetic field strength and, thus, braking force.

Whether a system employs friction devices or magnetic fields, the braking force may be user adjustable without disassembling the reel by providing one or more knobs or levers that are user accessible on the outside of the reel. These may operate by having a camming surface inside the reel that changes the relationship of the internal braking components in response to manipulation of the knob or lever. However, such systems do not provide for fine control of braking force since the cam cannot operate along a length greater than the circumference of the knob to which it is attached. Range of adjustment may also be limited for the same reason.

What is needed is a system and method for addressing the above, and related, problems.

SUMMARY OF THE INVENTION

The invention of the present disclosure, in one aspect thereof, comprises a device having a spool rotatable about an axis in a reel, and a braking structure that effects a braking force against rotation of the spool, the braking force being adjustable by changing a proximity of the braking structure relative to the spool. The device includes at least one tap in a fixed relationship with respect to the braking structure, and a brake dial accessible outside the reel and providing a threaded portion that accepts the at least one tap, the brake dial being rotatable to change the proximity of the braking structure relative to the spool by movement of the tap.

In some embodiments, the device includes a spool cap providing a bearing on a first side thereof, the bearing carrying a spool shaft proceeding from the spool along the axis. The spool cap is in a fixed relationship with respect to the reel and rotationally fixed, but not axially fixed, with respect to the braking structure located on the first side of the spool cap. The spool cap abuts the brake dial on a second, opposite side of the spool cap, and the spool cap provides at least one opening for the at least one tap to reach the threaded portion of the brake dial, the opening being sized to allow axial longitudinal movement of the tap.

Some embodiments include an end cap affixed to the reel. The spool cap may be affixed to the end cap with the brake dial interposing the spool cap and end cap. The end cap may also define an opening to allow user rotation of the brake dial.

In some embodiments the braking structure comprises a brake ring element carrying a braking surface that selectively engages with a plurality of radially placed and centrifugally extensible braking elements contained in a braking element structure affixed to the spool. The radially placed braking elements may be staggered longitudinally along the axis of rotation of the spool such that a number of braking elements engaging the braking surface depends upon the proximity of the brake ring element to the spool. The braking structure may be rotationally fixed with respect to the spool cap by at least one arm providing at least one receptacle in longitudinal sliding engagement with at least one boss extending from the spool cap toward the spool.

In some embodiments, the braking structure comprises a magnet carrier with a plurality of magnets facing the spool. The magnet carrier may be rotationally fixed with respect to the spool cap by at least one post in sliding engagement with at least one receptacle in the spool cap.

The invention of the present disclosure, in another aspect thereof, comprises a device having a spool rotatable about an axis passing through a reel frame and a brake element retaining structure affixed to the spool about the shaft and providing a plurality of radially arranged and axially longitudinally staggered braking elements that extend radially from the brake element structure under centrifugal force. A brake ring structure provides a braking surface that selectively engages more or fewer of the plurality of braking elements when the same are under centrifugal extension depending upon the proximity of the brake ring structure to the spool. At least one tap is provided on an arm extending from the brake ring structure, and an exteriorly threaded brake dial receives the at least one tap and operates to adjust the proximity of the brake ring structure to the spool by rotation of the brake dial.

Some embodiments further include a spool cover in a fixed relationship with respect to the reel frame. The spool cover interposes the brake dial and the brake ring structure and provides at least one cutout therein allowing the at least one tap provided by the brake ring structure to fit into the threaded brake dial. The spool cover may provide at least one boss that receives, in sliding engagement, at least one receptacle defined in at least one receptacle arm extending from the brake ring assembly thereby allowing axial longitudinal movement of the brake ring assembly but preventing rotational movement.

In some embodiments the spool cover provides a bearing that receives a shaft from the spool in rotational engagement. An external end cover may be included in a fixed relationship with respect to the reel frame and the spool cover. The brake dial may interpose the spool cover and the external end cover with the external end cover defining an opening allowing user access to the brake dial.

The invention of the present disclosure, in another aspect thereof, comprises a device having a spool rotatable about an axis passing through a reel frame and a magnetic braking structure having a plurality of magnets for retarding the rotation of the spool in varying degrees depending upon the proximity of the braking structure to the spool. At least one tap extends from the braking structure. An exteriorly threaded brake dial receives the at least one tap and is operable to adjust the proximity of the magnetic braking structure to the spool by rotation of the brake dial.

In some embodiments, the device further comprises a spool cap in a fixed relationship with respect to the reel frame, the spool cap interposing the brake dial and the magnetic braking structure and defining a longitudinal opening allowing the tap to pass to the threaded brake dial. The magnetic braking structure may be rotationally fixed with respect to the spool cap by at least one post extending from the magnetic braking structure into sliding engagement with at least one receptacle defined in the spool cap.

The device may include a shaft bearing affixed to the spool cap that receives, in a rotational engagement, a shaft proceeding from the spool. The device may include an exterior cover affixed to the frame and to which the spool cap is affixed. The brake dial interposes the exterior cover and the spool cap, the exterior cover defining an opening allowing user access to the brake dial.

DETAILED DESCRIPTION OF THE PREFERRED EMBODIMENTS

Figure 1:
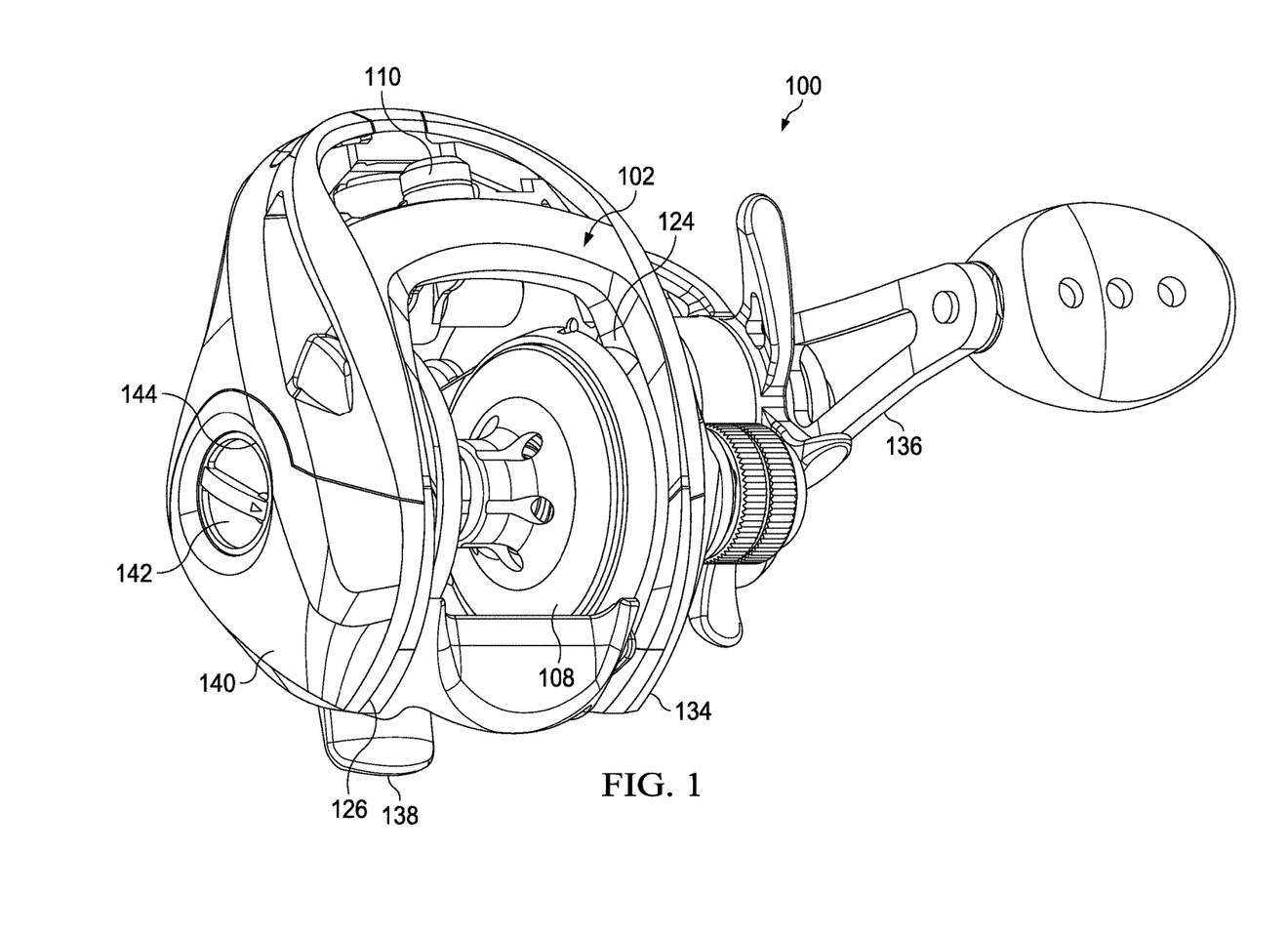
FIG. 1 is a perspective view of a baitcasting reel according to aspects of the present disclosure.

Referring now to FIG. 1, a perspective view of a baitcasting reel 100 according to aspects of the present disclosure is shown. The baitcasting reel 100 incorporates one embodiment of an infinitely adjustable, centrifugal braking apparatus as described herein. Baitcasting reel 100 comprises a frame 102 having a right side plate 104 and a left side plate 106. A line spool 108 is rotatably mounted in frame 102 between side plates 104 and 106. A level-wind mechanism 110 may be provided, which traverses over the spool 108 during winding of the reel 100 to ensure that the line is properly (e.g., evenly) wound along the entire length of the spool 108. A crank handle 136 is provided for winding the reel. A foot 138 is provided on the bottom of the frame 102 for attaching reel 100 to a fishing rod. In some embodiments, the frame 102, including side plates 104, 106, and/or foot 138 may be formed integrally.

A right side cover 134 may be secured over side plate 124 (possibly before the handle 136 is affixed) and a left side cover 140 may be secured over left side plate 126. In the illustrated embodiment, the infinitely adjustable, centrifugal braking apparatus of the present disclosure is located on the left side of the reel 100, under or within the left side cover 140. When reel 100 is assembled, the only externally visible feature of the infinitely adjustable, centrifugal braking apparatus may be a brake dial 142 projecting through a circular aperture 144 formed in left cover 140.

Although, for convenience, the embodiments of the present disclosure are shown and described as incorporated in a right-handed baitcasting reel, the technology of the present disclosure is equally adaptable for use in left-handed baitcasting reels. As will be understood by those skilled in the art, a left-handed version of generally any baitcasting reel can be produced by simply reversing the arrangement and structure of the reel's components such that the left-handed reel is a mirror image of the right-handed version of the reel.

Figure 2:
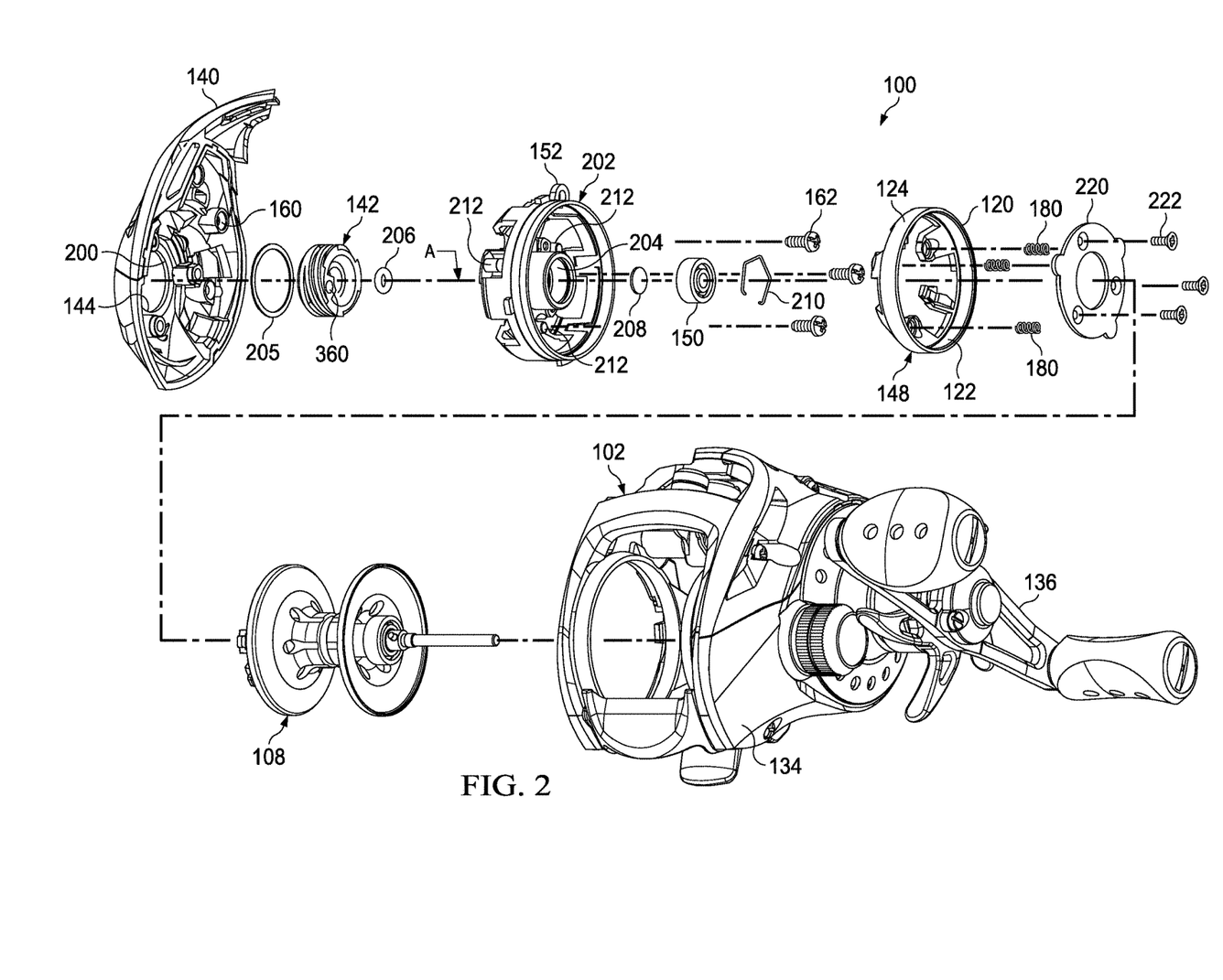
FIG. 2 is a partially exploded perspective view of the baitcasting reel of FIG. 1 viewed from the right.
Figure 3:
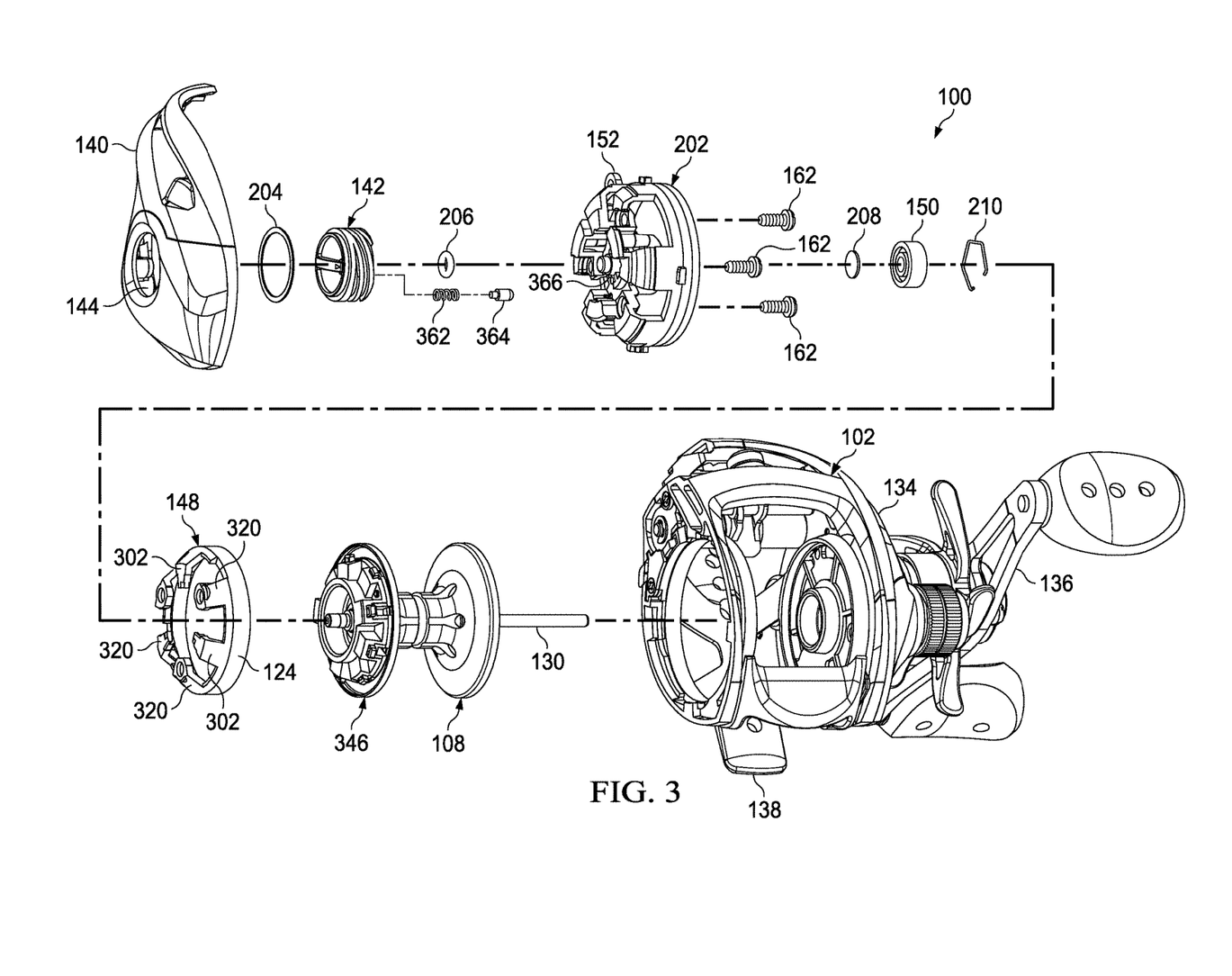
FIG. 3 is a partially exploded perspective view of the baitcasting reel of FIG. 1 viewed from the left.

Referring now to FIG. 2, a partially exploded perspective view of the baitcasting reel 100 of FIG. 1 is shown from the right side. FIG. 3 illustrates the baitcasting reel 100 in a partially exploded view from the left side. Beginning near the left hand side of the exploded views, a dial washer 204 may interpose the brake dial 142 and the left side cover 140. A dial friction ring 206 may sit below (e.g., to the right of) the brake dial 142 to aid in retaining the brake dial 142 at its selected location. The brake dial 142 may be rotatably held between an internal radial shoulder 200 formed in side cover 140 around circular aperture 144 and the outer side of an interior spool cover 202. A thin, friction reducing ring 204, washer, or other such element may be positioned between the brake dial 142 and the interior radial shoulder 200 of side cover 140.

The interior spool cover 202 may include a cylindrical interior cavity 205 for holding a spool shaft bearing or bushing 150. Where necessary, a shim 208 may be used to aid in proper placement and retention of shaft bearing 150 and/or shaft 130 of a spool 108. The bearing 150 may be securely retained within the cavity 204 by a clip ring 210 cooperating with an appropriately placed circumferential slot in the interior of cavity 205.

Various ears 152, or other the projections or surface features, may be utilized on the spool cover 202 to aid in proper placement relative to the frame 102 and other surrounding components. The ear 152 may be sized and positioned to receive one of a possible plurality of internally-threaded bosses 160, provided in the interior of side cover 140, such that spool cover 202 can be secured to side cover 40 by screws 162, bolts, or other fasteners.

A brake ring assembly 148 comprises a brake ring 120, that may have an interior frusto-conical braking surface 122. In some cases, the brake ring 120 is held and carried by a collar 124. In some embodiments, the brake ring assembly 148 could be replaced with a unitary structure wherein, for example, a frusto-conical braking surface is integrally formed in collar 124.

A brake ring spring retainer 220 (FIG. 2 only) may be affixed by a series of screws 222 to the spool cap 202 and keep the brake ring assembly 148 under continual bias toward the spool cap 202. Of course, when assembled as shown in FIG. 1 the spool 108 fits substantially within the frame 102 and rotates operationally about axis A. The side cover 140 holds the spool cap 202 and other components shown in FIGS. 2-3 in proper operational positions by affixing to the frame 102, possibly by a clip, latch, or other fastener (not shown).

Figure 4:
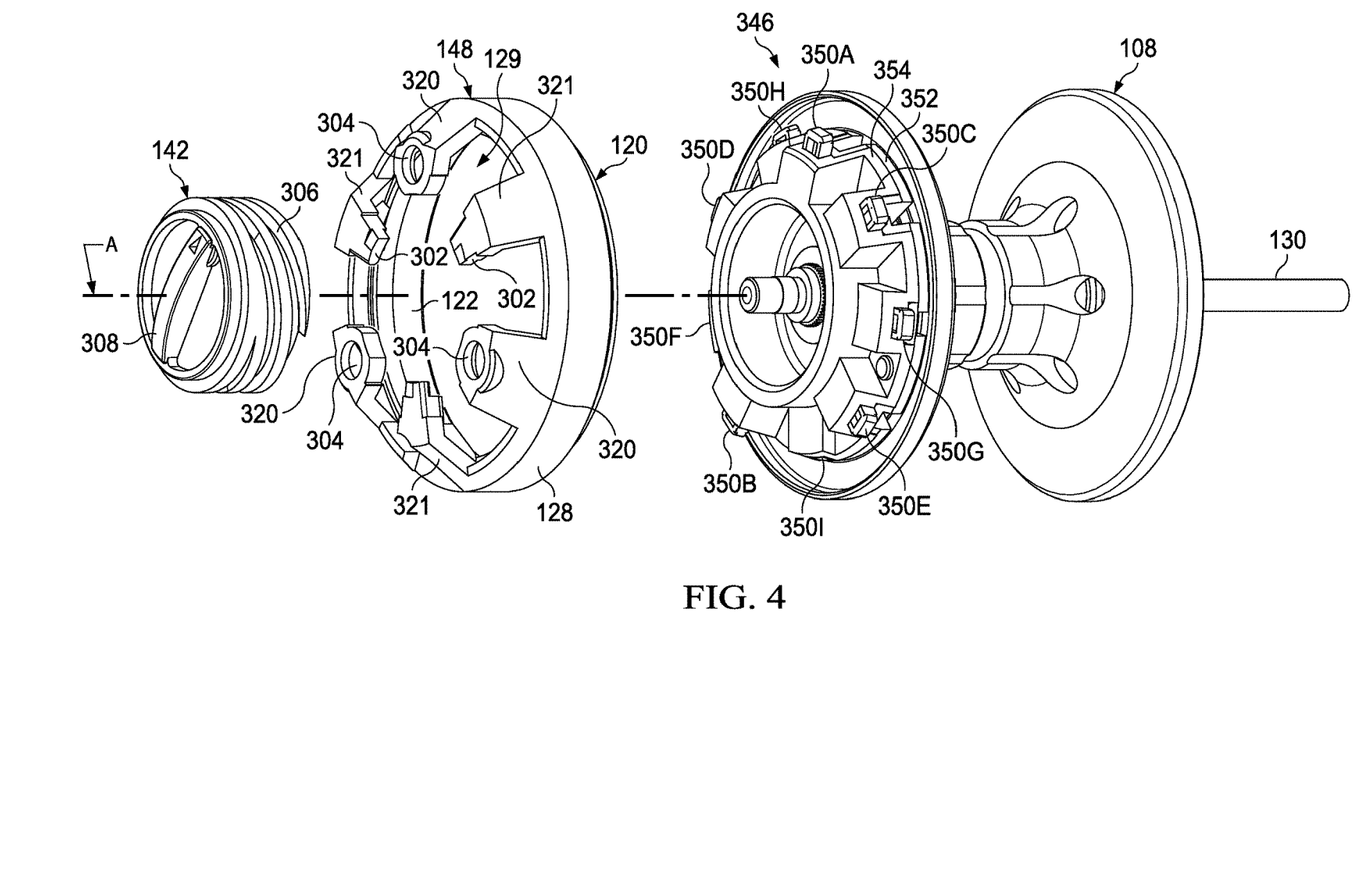
FIG. 4 is a close-up partially exploded perspective view of a portion of the baitcasting reel of FIG. 1 illustrating the brake ring assembly and the brake element assembly.

Referring now to FIG. 4, a close-up partially exploded perspective view of a portion of the baitcasting reel of FIG. 1 illustrating the brake ring 148 assembly and a brake element assembly 346 is shown. In the present embodiment, the brake element assembly 346 includes an inner cover 352 and an outer cover 534. The inner cover 352 is taken as being closest to the body of the spool 108. Together, the inner cover 352 and outer cover 354 provide retention and location for a plurality of brake elements 350A, B, C, D, E, F, G, H, and I (collectively, brake elements 350).

As depicted in FIGS. 7-10, each brake element 350 may be a T-shaped structure having a longitudinal axis 756, a wide retaining end 758, an elongate portion 760 extending from retaining end 758, and a pair of retaining shoulders 762 defined by the transition from retaining end 758 to elongate portion 760. Elongate portion 760 may have a distal end 764 providing an angled brake pad 766. Each brake element 350 preferably has both a flat forward surface 68 and a flat rearward surface 70.

Figure 11:
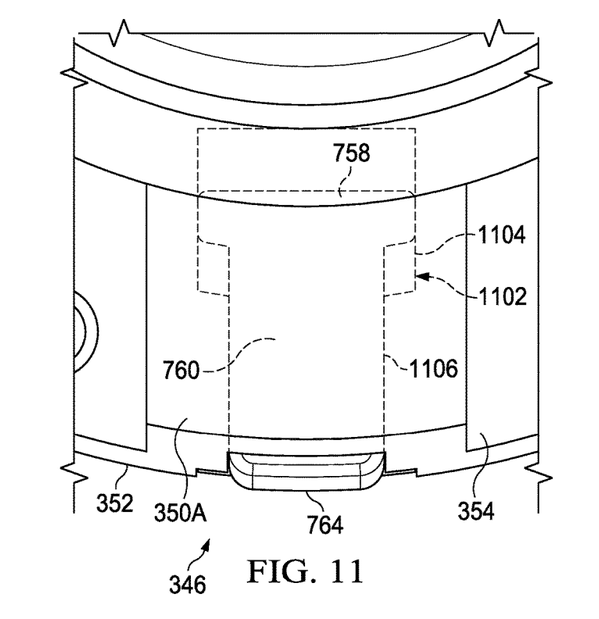
FIG. 11 is an elevational top view of a portion of a brake element assembly illustrating brake element retention.

Referring now to FIG. 11, a top down view of a portion of the braking element assembly 346 is shown. Here it can be seen how a cavity 1102 may be defined in the outer cover 354 that retains the braking elements 350 but provides for some lateral movement for engaging in braking. The wide end 758 of braking element 350 is allowed to move laterally in or out of the cavity 1102 in a wide portion 1104 but cannot advance beyond a narrow portion 1106. It will also be appreciated that the cavity could be defined in the inner cover 352 or a combination of the inner cover 352 and outer cover 354.

In operation, under centrifugal force (e.g., as would be generated during a casting operation), the braking elements 350 begin to protrude from the braking element assembly 346. As described in greater detail below, depending upon how the brake system of the reel 100 is adjusted, one or more of these brake elements 350 make contact with the braking surface 122 of the brake ring assembly 148. This will act to slow or retard the spinning of the spool 108. The greater the rate of spin of the spool 108, the more braking force will be applied by the braking members that contact the braking surface 122. As spin decreases, so does braking force. It will be appreciated that to increase overall braking force, the braking ring assembly 148 can be moved into position such that the braking surface 122 contacts more of the braking elements 350.

Referring now back to FIG. 4, the brake ring assembly 148 includes a collar 128 defining a substantially cylindrical bore 129 wherein brake ring 120 may be press fitted or otherwise retained. Atop, or leftward, of the bore 129 is a series of arms 320 that project both upward (left) and inward from the bore 128. These may define openings or receptacles 304 aligned laterally and in parallel with the central axis A. Openings 304 are configured to mate with bosses 212 (FIG. 2) that project from the interior of the spool cover 202. It will be appreciated that this arrangement allows for some displacement of the brake ring assembly 148 in an axial direction while maintaining the brake ring assembly 148 and the spool cover 202 in substantially the same rotational orientation. The spool cover 202, being affixed to the cover 140 and, in turn, to the frame 102, allows for the braking force of the interaction between the brake ring assembly 148 and the braking element assembly 346 to exert a slowing force on the spool 108.

Figure 5:
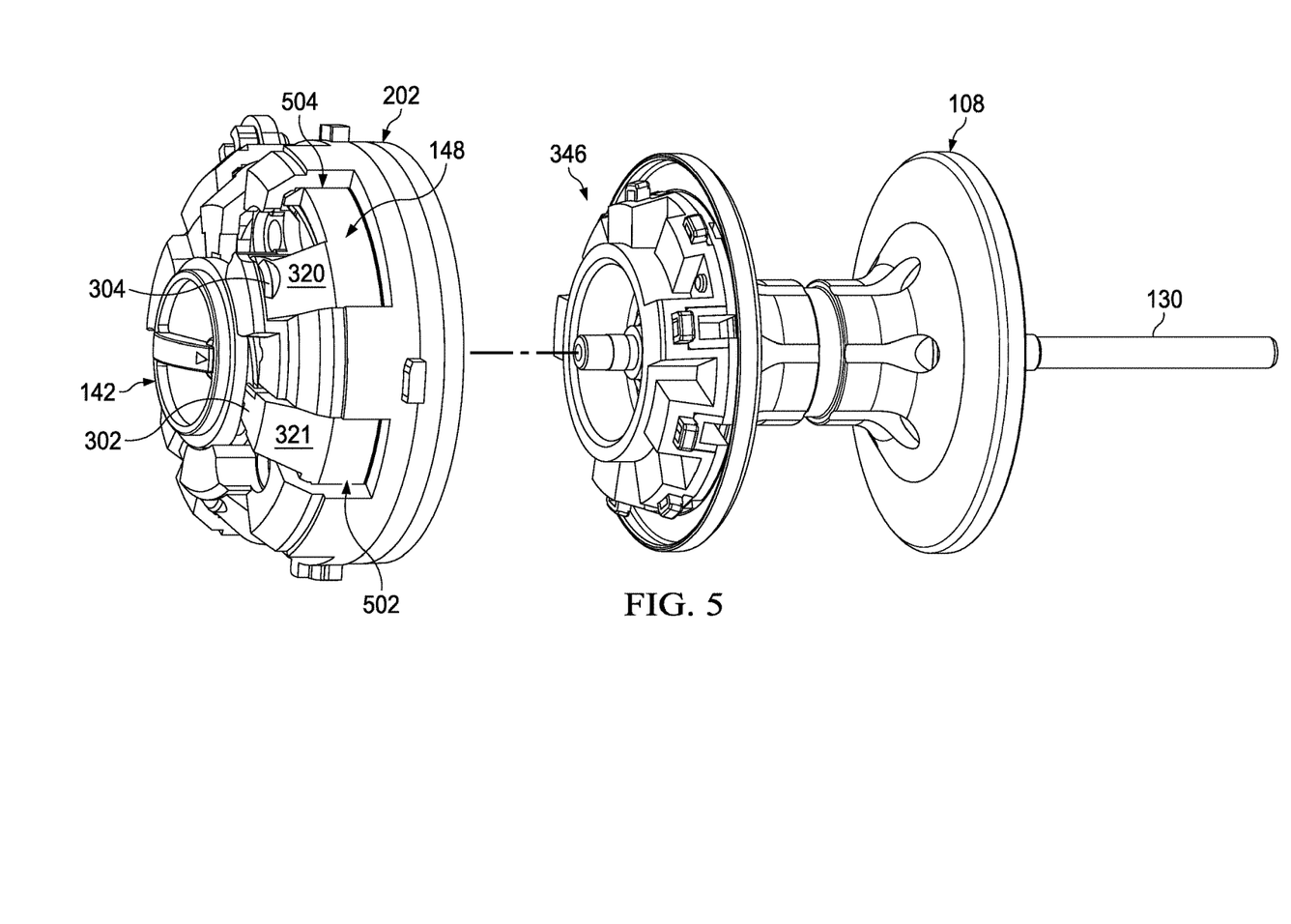
FIG. 5 is a close-up partially exploded perspective view of the portion of the view of the baitcasting reel of FIG. 1 including the spool cap.

Referring now also to FIG. 5, a side perspective cutaway view of a portion of an assembled baitcasting reel according to aspects of the present disclosure is shown. FIG. 5 illustrates how, when the reel 100 is assembled, the brake ring assembly 148 is nested within the spool cover 202 with the bosses 212 inserted into the openings 304.

The bored collar 128 of the brake ring assembly 148 also provides one or more inwardly and upwardly (leftwardly) projecting arms 321 that terminate in taps 302. The taps 302 face substantially laterally and inward toward the central axis A and mate with threads 306 provided on at least a circumferential portion of the generally cylindrical brake dial 142. When assembled, the brake dial is retained between the cover 140 and the spool cover 202, as previously described. Therefore, rotation of the brake dial 142 will operate to urge the brake ring assembly 148 toward (or away from) the brake element assembly 346. Rotation of the brake dial will overcome the biasing force of springs 180 (FIG. 2) that urge the brake ring assembly 148 toward the spool cover 202.

The spool cap 202 provides a cutaway 502 therein for each of the arms 321 that properly locate the taps 302 in the threads 306. A cutaway 504 may also be provided for each arm 320 to increase range of motion and decrease overall size of the assembled reel 100.

In the present embodiment, three taps 302 are provided approximately 120 degrees apart around the collar 128. In the present embodiment, three discrete thread tracks are provided by threads 306. The three arms 320 are also spaced approximately 120 degrees from one another and equidistant between the taps 302. The present configuration allows a rotation of the brake dial of up to about 250 degrees. Thus, much finer control of the position of the brake ring assembly 148 is possible compared to prior adjustment mechanisms. This results in a greater possible variation in braking force as more or fewer braking elements 350 are engaged (completely or partially) by the braking surface 122 when the braking elements 350 are placed under centrifugal load (e.g., during a cast).

It will also be appreciated that in other embodiments, more or fewer taps 302, and thread tracks could be employed. Similarly, more or fewer arms 320, receptacles 304, and bosses 212 may be utilized. However, the configuration as shown in the several drawings provides a high degree of adjustability, stability, and reliability in a compact size.

When the reel 100 is assembled, springs 180 urge braking ring assembly 148 toward the spool cap 202 such that the taps 302 are maintained in operable contact with threads 306. As the user turns brake dial 42 counterclockwise, the brake ring assembly 148 is urged toward the spool cap (left). When the brake dial 42 is placed in its full counterclockwise position, the brake ring assembly 148 is at its outermost position (e.g., furthest from the spool 108).

Although theoretically infinite adjustment can be provided by the current configuration, it will be appreciated that increased repeatability of adjustments may be desired by some users. Referring back to FIGS. 2-3, the brake dial 142 may be provided with a receptacle 360 (FIG. 2) that accepts a spring 362 (FIG. 3) and pin 364 (FIG. 3). The spring and pin may interact with detents 366 molded, cut, or otherwise placed, into the top (left) of spool cover 202. Therefore, the brake dial 142 may "snap" into place at repeatable intervals (e.g., every 15 degrees). These intervals may be indicated on the cover 140 with an index mark or marks on the brake dial 142 visible to the user when the reel 100 is assembled.

Figure 6:
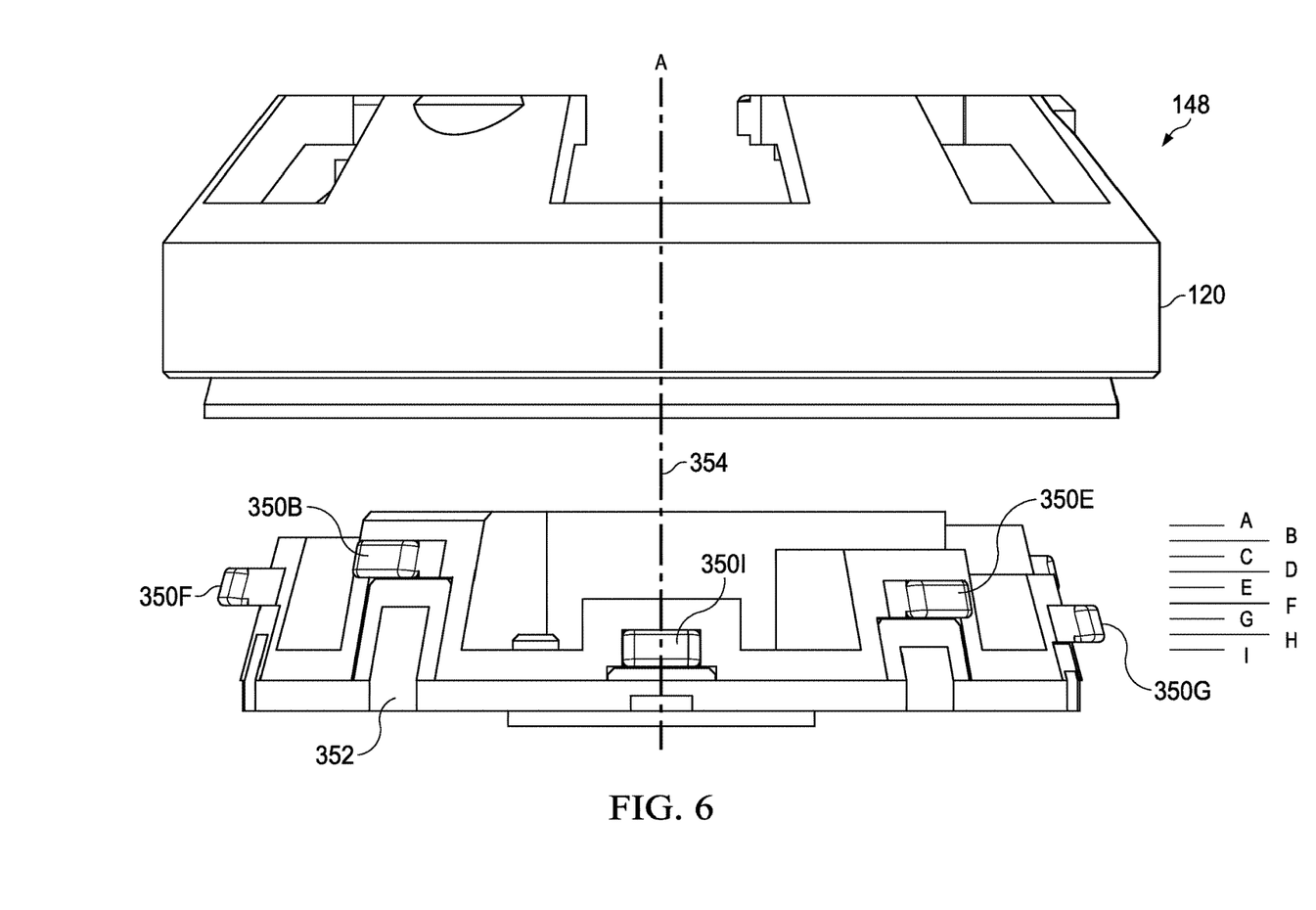
FIG. 6 is a side close-up view of a brake element assembly according to the present disclosure.
Figure 7:
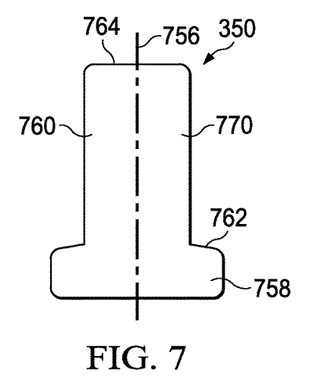
FIG. 7 is an elevational rear view of a brake element according to the present disclosure.
Figure 8:
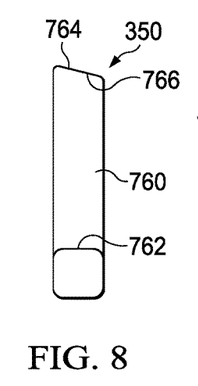
FIG. 8 provides an elevational side view of the brake element of FIG. 7.
Figure 9:
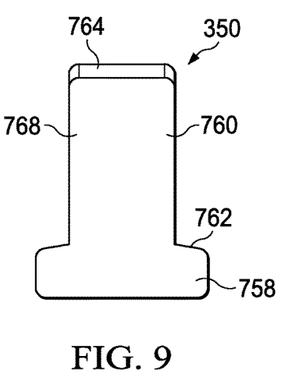
FIG. 9 provides an elevational front view of a brake element of FIG. 7.
Figure 10:
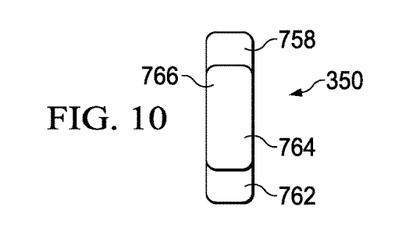
FIG. 10 provides an elevational top view of a brake element of FIG. 7.

Referring now to FIG. 6 it can be seen that the positioning of the brake elements 350A-I along the axis A operates in conjunction with the axial movement of brake ring 120 to produce a desired level of braking effect. The longitudinal axis 756 of each brake element 350A-I retained in radially equidistance positions about axis A between outer cover 354 and inner cover 352 lies in a unique plane perpendicular to axis A. The planes are marked A-I in FIG. 6. If brake ring 120 is placed in an upward/leftward-most, non-braking position, none of brake elements 350A-I can contact braking surface 122. An initial braking position would be at the plane I where braking surface 122 begins to contact the braking element 350A. As brake dial 142 is turned counterclockwise to move brake ring 120 toward brake element assembly 346, braking surface 122 successively begins to contact more individual elements 350B-I, thereby increasing the relative braking force applied in response to a given rotational speed. In addition, the conical nature of brake ring 120 provides variable braking effect. This is due firstly to individual brake elements 350 successively beginning to contact braking surface 122. Additionally, as the brake ring 120 is moved rearward, the brake ring 120 automatically reduces the radius over which an active element 350 operates, thereby varying the braking force applied by that brake element 350 to the braking surface 120. These effects work in concert to provide a braking system which is infinitely adjustable over its braking range. When dial 142 is rotated to its full counterclockwise position, brake ring 120 is placed in its rear most position such that all brake elements 350A-I can contact the braking surface 122.

Figure 12:
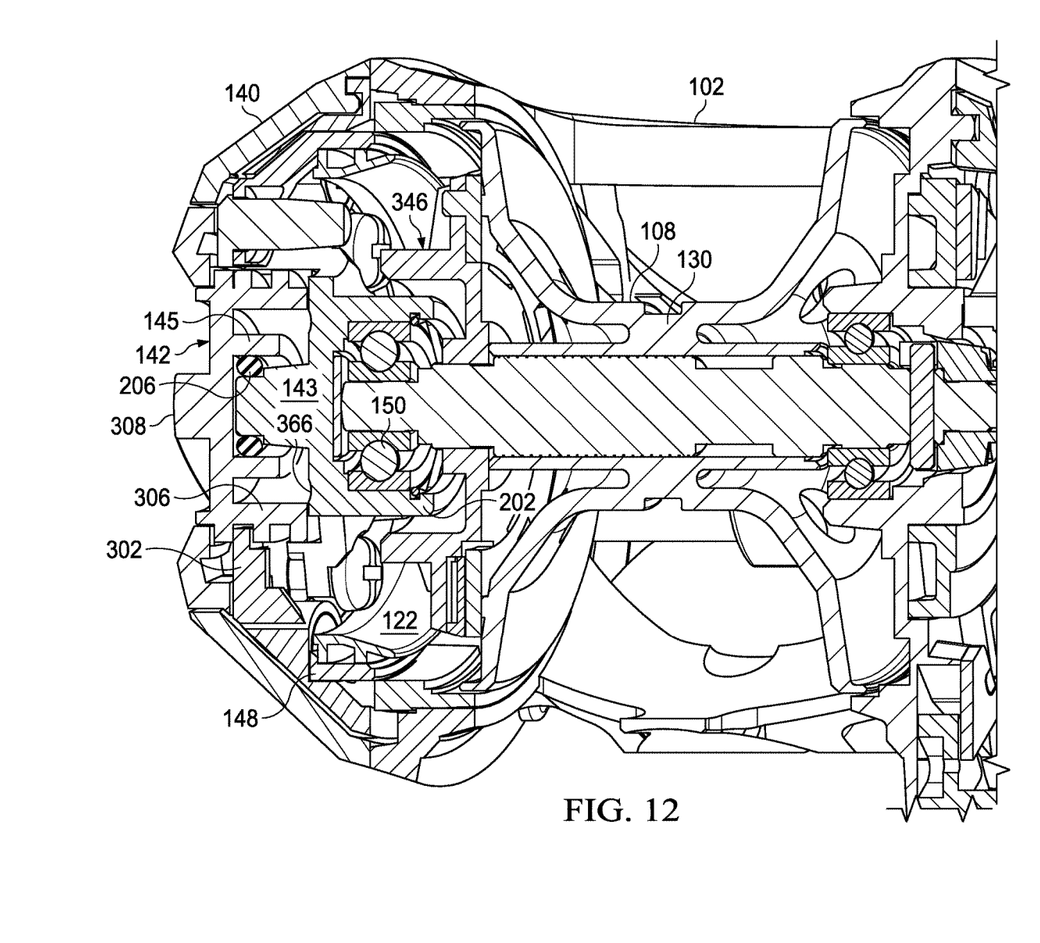
FIG. 12 is a perspective cutaway view of a portion of the reel of FIG. 1 showing the assembled braking and adjustment mechanism of one embodiment of the present disclosure.

The assembled reel 100 can be seen in cutaway in FIG. 12. The brake dial 142 can be seen in place against the spool cap 202. A post 143 may retain the friction washer 206 in place within an interior wall 145 of the brake dial 142. Taps 302 (out of frame) engage threads 306 and move the braking surface 122 in response to rotation thereof. Detents 366 can be seen that interact with pin 364 (out of frame) for repeatability of adjustments.

As will also be understood by those skilled in the art, other types of braking element assemblies (e.g., radially extending rods having braking weights, pads, and/or bristles slidably mounted thereon) could be used according to the present disclosure. However, regardless of the type of assembly used, some or all of the individual braking elements be may be positioned at differing longitudinal locations along the assembly's rotational axis (e.g., axis A). The positioning of the brake elements may ensure that the brake ring 120 will sequentially encompass additional elements or additional groups of elements as the brake ring is adjusted from a non-contacting position to a full contacting position.

Figure 13:
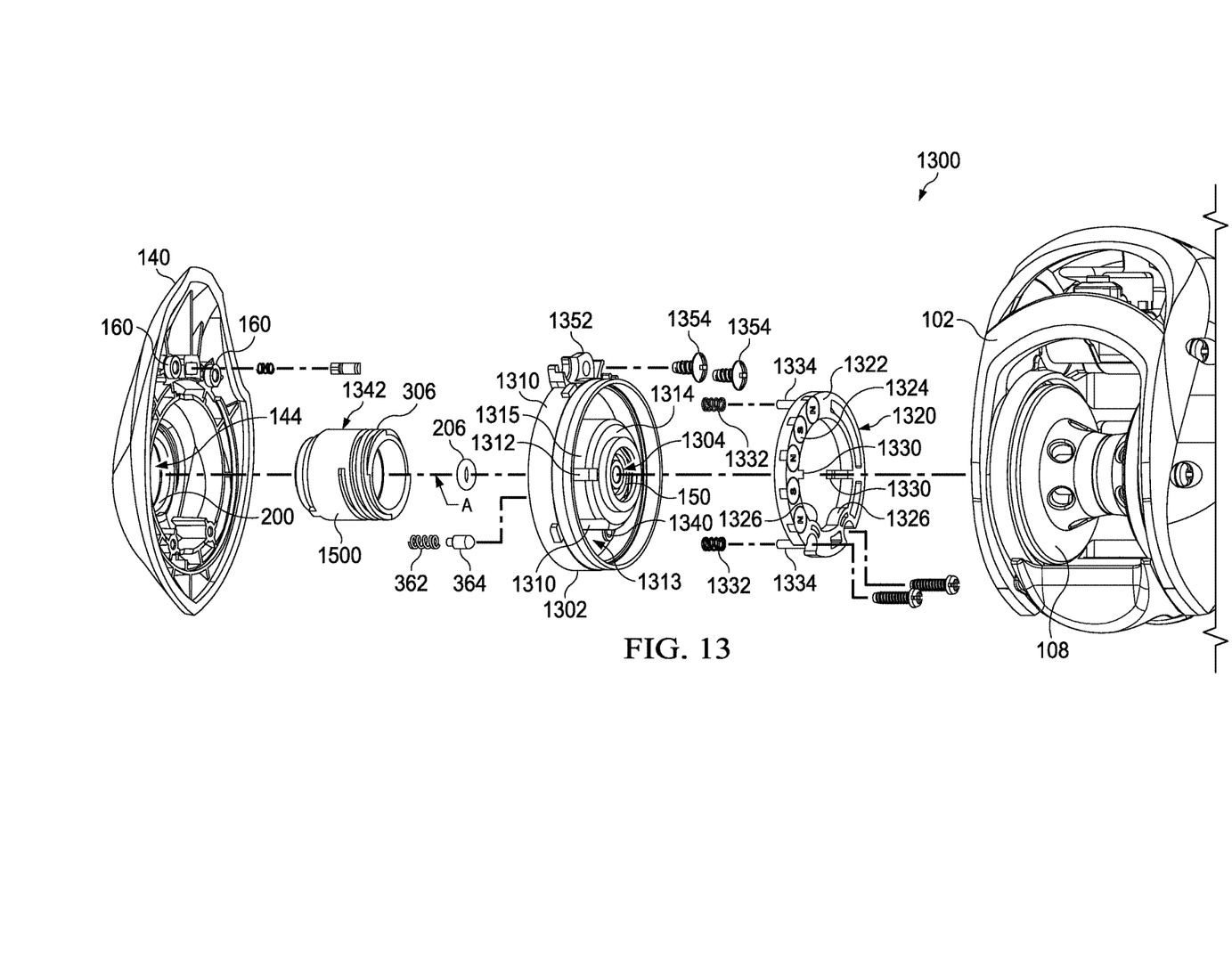
FIG. 13 is an exploded perspective view of another baitcasting reel according to aspects of the present disclosure.

It will be appreciated that the brake ring assembly 148 acts as a movable braking structure that is movable longitudinally (e.g., along axis A) in response to user adjustment of the brake dial 142 to effect potentially very small changes in longitudinal position. The fine adjustment mechanism provided by the interaction of brake dial 142 and the brake ring assembly 148 is adaptable for use in magnetically damped or braked reel systems that rely on a movable magnetic braking structure. Referring now to FIG. 13, an exploded perspective view of another baitcasting reel according to aspects of the present disclosure is shown. The reel 1300 provides a magnetic braking mechanism for retarding rotation of the spool 108. In magnetic embodiments, the spool 108, being metallic, is slowed in rotation in the presence of a magnetic field. The field strength may be varied to adjust braking operation. The present embodiment may be better understood by reference also to FIG. 14, a perspective view of an adjustable magnetic brake ring assembly for use with certain embodiments of the present disclosure, and FIG. 15, a cutaway view of a portion of the reel of FIG. 13.

The reel 1300 shares many components with the reel 100 described above. The spool 108 rotates, in operation, about central axis A and sits within frame 102. Left cover 140 affixes to the frame 102 retaining the internal pieces against axial displacement. A spool cover 1302 comprises an annular outer wall 1310 surrounding an annular inner wall 1315. The two walls 1310, 1315 may be joined by an outer plate 1313. The inner wall 1315 may terminate opposite the outer plate 1313 at an inside plate 1314. The inside plate 1314 may define a cavity 1304 for retaining bearing 150 on the left end of the spool 108 that receives spool shaft 130 and allows rotation thereof about axis A.

The spool cover 1302 is affixed to the cover 140 and may provide various ears 1352 and other features on the outside wall 1310 or elsewhere allowing it to be securely fastened to the cover 140. In the present embodiment, a pair of screws 1354 retain the spool cover 1302 into the cover 140 by threading into bosses 160. The cover 140 provides an opening into which a brake dial 1342 is at least partially inserted, resting against and being retained by shoulder 200. The brake dial 1342 is thus sandwiched between the cover 140 and spool cover 1302 when the reel 1300 is assembled.

Figure 15:
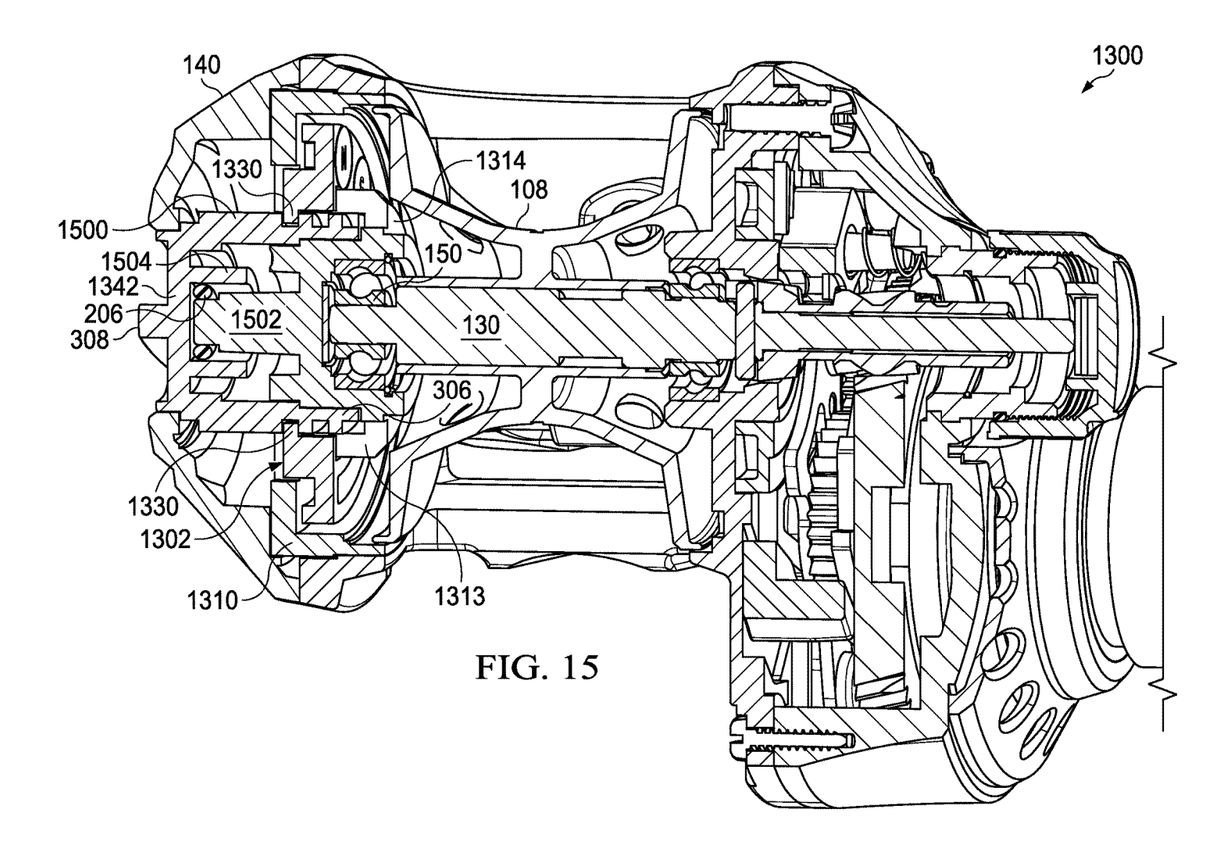
FIG. 15 is a perspective cutaway view of a portion of the reel of FIG. 13 showing the assembled braking and adjustment mechanism of one embodiment of the present disclosure.

The brake dial 1342 provides threads 1306 around at least a portion of an exterior circumference of its generally cylindrical body 1500. A dial friction ring 206 may interpose the spool cover 1302 and the brake dial 1342. The brake dial 1342 may also accept spring 362 and pin 364 to interact with detents in the upper/left surface of the spool cap 1342. Thus, as with the reel 100, adjustments of the brake dial may be more easily repeatable. With reference particularly to FIG. 15 it can be seen that the spool cap 1302 may provide a post 1502 that inserts into the body 1500 of the brake dial 1342 and may be retained by an internal wall 1504 of the brake dial body 1500. In the present embodiment, the friction ring 206 is retained between the brake dial body 1500 and the post 1502.

Figure 14:
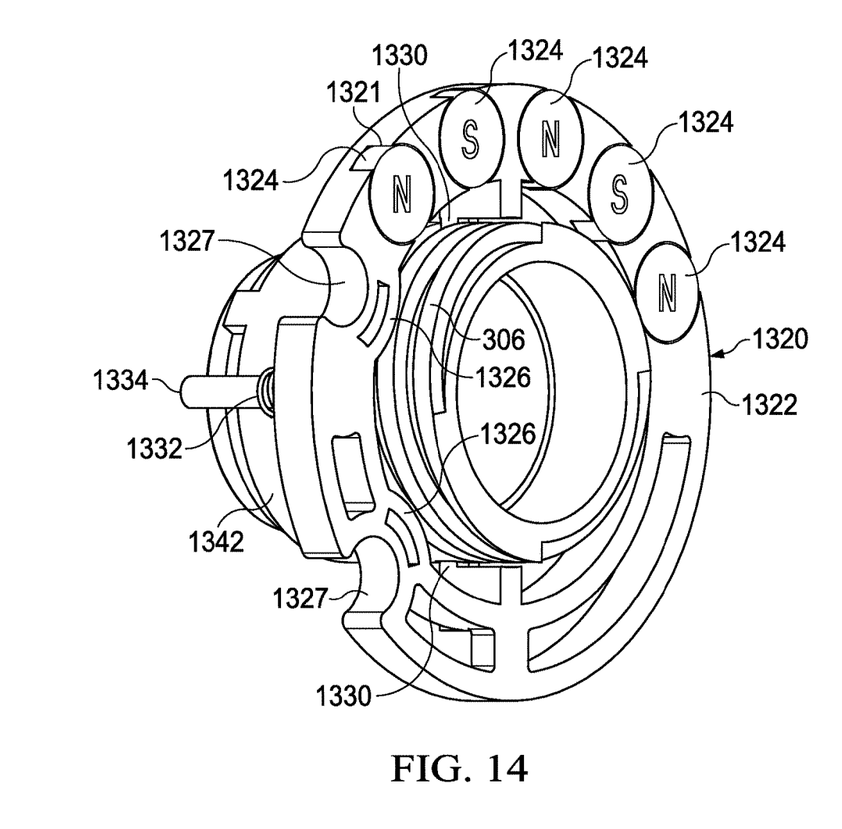
FIG. 14 is a perspective view of an adjustable magnetic brake ring assembly for use with certain embodiments of the present disclosure.

On the side of the spool cap 1302 opposite the brake dial 1342 is a magnetic brake ring assembly 1320 that also functions as a magnet carrier. The magnetic brake ring assembly 1320 comprises a generally annular body 1322 defining a plurality of recesses 1321 sized to retain a plurality of magnets 1324 facing the spool 108. In the present embodiment, 5 magnets are provided with alternating north and south poles facing the spool 108. However, more or fewer magnets could be utilized based upon the strength of the magnets and the overall amount of braking force desired.

The magnetic brake ring assembly 1320 should be held in the same rotational position as the spool cap 1302 and cap 140 but allowed freedom of movement axially toward and away from the spool 108 as determined by the rotational position of brake dial 1342. Therefore, various surface features and fastening means may be utilized to affix the magnetic brake ring assembly to the spool cover 1302. In the present embodiment, posts 1334 insert slidably into receptacles 1340 in outside plate 1313. Springs 1332 may be used on the posts 1334 to urge the body 1322 away from the spool cover 1302 providing a constant axial position (again, determined by the brake dial 1342). Various longitudinal guide slots 1340 may be defined in the inside wall 1312 that interact with interior facing guides 1326 on the body 1322 to allow sliding axial movement but impede rotational movement about the axis A.

The brake dial interacts with magnetic brake ring assembly 1320 through open guide slots 1312 in inner wall 1315. The brake ring body 1322 provides a pair of inwardly facing taps 1330 that are guided within threads 306 of brake dial 1342. As the brake dial 1342 is rotated counterclockwise, the magnetic brake ring assembly 1320 is urged toward the spool 108, thereby increasing the magnetic field acting on the spool 108, which will increase the braking force experienced by the spool 108 when it rotates. Correspondingly, a clockwise rotation of the brake dial will pull the magnetic brake ring assembly away from the spool 108, thereby decreasing the magnetic field at the spool 108 and also the braking force experienced by a spool 108 when spinning.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A device comprising:
   a spool rotatable about an axis in a reel;
   a braking structure that effects a braking force against rotation of the spool, the braking force being adjustable by changing a proximity of the braking structure relative to the spool;
   at least one tap in a fixed relationship with respect to the braking structure; and
   an infinitely adjustable brake dial accessible outside the reel and providing a threaded portion that accepts the at least one tap, the brake dial being rotatable to change the proximity of the braking structure relative to the spool by movement of the tap;
   a spool cap providing a bearing on a first side thereof, the bearing carrying a spool shaft proceeding from the spool along the axis;
   wherein the spool cap is in a fixed relationship with respect to the reel and rotationally fixed, but not axially fixed, with respect to the braking structure located on the first side of the spool cap;
   wherein the spool cap abuts the brake dial on a second, opposite side of the spool cap; and
   wherein the spool cap provides at least one opening for the at least one tap to reach the threaded portion of the brake dial, the opening being sized to allow axial longitudinal movement of the tap.

2. The device of claim 1, further comprising:
   an end cap affixed to the reel;
   wherein the spool cap is affixed to the end cap with the brake dial interposing the spool cap and end cap; and
   wherein the end cap defines an opening to allow user rotation of the brake dial.

3. The device of claim 1, wherein the braking structure comprises a brake ring element carrying a braking surface that selectively engages with a plurality of radially placed and centrifugally extensible braking elements contained in a braking element structure affixed to the spool.

4. The device of claim 3, wherein the radially placed braking elements are staggered longitudinally along the axis of rotation of the spool such that a number of braking elements engaging the braking surface depends upon the proximity of the brake ring element to the spool.

5. The device of claim 1, wherein the braking structure is rotationally fixed with respect to the spool cap by at least one arm providing at least one receptacle in longitudinal sliding engagement with at least one boss extending from the spool cap toward the spool.

6. The device of claim 1, wherein the braking structure comprises a magnet carrier with a plurality of magnets facing the spool.

7. The device of claim 6, wherein the magnet carrier is rotationally fixed with respect to the spool cap by at least one post in sliding engagement with at least one receptacle in the spool cap.

8. A device wherein:
   a spool rotatable about an axis passing through a reel frame;
   a brake element retaining structure affixed to the spool about a shaft and providing a plurality of radially arranged and axially longitudinally staggered braking elements that extend radially from the brake element retaining structure under centrifugal force;
   a brake ring structure providing a braking surface that selectively engages more or fewer of the plurality of braking elements when the same are under centrifugal extension depending upon the proximity of the brake ring structure to the spool;
   at least one tap provided on an arm extending from the brake ring structure; and
   an exteriorly threaded infinitely adjustable brake dial receiving the at least one tap and operable to adjust the proximity of the brake ring structure to the spool by rotation of the brake dial;
   a spool cover in a fixed relationship with respect to the reel frame;
   wherein the spool cover interposes the brake dial and the brake ring structure; and
   wherein the spool cover provides at least one cutout therein allowing the at least one tap provided by the brake ring structure to fit into the threaded brake dial;
   wherein the spool cover provides at least one boss that receives, in sliding engagement, at least one receptacle defined in at least one receptacle arm extending from the brake ring structure thereby allowing axial longitudinal movement of the brake ring assembly but preventing rotational movement.

9. The device of claim 8, further comprising an external end cover in a fixed relationship with respect to the reel frame and the spool cover.

10. The device of claim 9, wherein the brake dial interposes the spool cover and the external end cover, the external end cover defining an opening allowing user access to the brake dial.

11. A device wherein:
   a spool rotatable about an axis passing through a reel frame;
   a brake element retaining structure affixed to the spool about a shaft and providing a plurality of radially arranged and axially longitudinally staggered braking elements that extend radially from the brake element retaining structure under centrifugal force;
   a brake ring structure providing a braking surface that selectively engages more or fewer of the plurality of braking elements when the same are under centrifugal extension depending upon the proximity of the brake ring structure to the spool;
   at least one tap provided on an arm extending from the brake ring structure; and an exteriorly threaded infinitely adjustable brake dial receiving the at least one tap and operable to adjust the proximity of the brake ring structure to the spool by rotation of the brake dial;

a spool cover in a fixed relationship with respect to the reel frame;

wherein the spool cover interposes the brake dial and the brake ring structure; and wherein the spool cover provides at least one cutout therein allowing the at least one tap provided by the brake ring structure to fit into the threaded brake dial;

wherein the spool cover provides a bearing that receives the shaft from the spool in rotational engagement.

12. The device of claim 11, further comprising an external end cover in a fixed relationship with respect to the reel frame and the spool cover.

13. The device of claim 12, wherein the brake dial interposes the spool cover and the external end cover, the external end cover defining an opening allowing user access to the brake dial.

14. A device comprising a spool rotatable about an axis passing through a reel frame;

a magnetic braking structure having a plurality of magnets for retarding the rotation of the spool in varying degrees depending upon the proximity of the braking structure to the spool;

at least one tap extending from the braking structure; and a brake dial defining a generally cylindrical body having an exterior circumference, wherein said body defines threads around at least a portion of said exterior circumference, said threads receiving the at least one tap and operable to adjust the proximity of the magnetic braking structure to the spool by rotation of the brake dial.

15. The device of claim 14, further comprising a spool cap in a fixed relationship with respect to the reel frame, the spool cap interposing the brake dial and the magnetic braking structure and defining a longitudinal opening allowing the tap to pass to the threaded brake dial.

16. The device of claim 15, wherein the magnetic braking structure is rotationally fixed with respect to the spool cap by at least one post extending from the magnetic braking structure into sliding engagement with at least one receptacle defined in the spool cap.

17. The device of claim 15, further comprising a shaft bearing affixed to the spool cap that receives, in a rotational engagement, a shaft proceeding from the spool.

18. The device of claim 15, further comprising an exterior cover affixed to the frame and to which the spool cap is affixed.

19. The device of claim 18, wherein the brake dial interposes the exterior cover and the spool cap, the exterior cover defining an opening allowing user access to the brake dial.

20. A device comprising:

a spool rotatable about an axis in a reel;

a braking structure that effects a braking force against rotation of the spool, the braking force being adjustable by changing a proximity of the braking structure relative to the spool;

at least one tap in a fixed relationship with respect to the braking structure;

a brake dial accessible outside the reel and providing a threaded portion that accepts the at least one tap, the brake dial being rotatable to change the proximity of the braking structure relative to the spool by movement of the tap;

a spool cap providing a bearing on a first side thereof, the bearing carrying a spool shaft proceeding from the spool along the axis;

wherein the spool cap is in a fixed relationship with respect to the reel and rotationally fixed, but not axially fixed, with respect to the braking structure located on the first side of the spool cap;

wherein the spool cap abuts the brake dial on a second, opposite side of the spool cap; and wherein the spool cap provides at least one opening for the at least one tap to reach the threaded portion of the brake dial, the opening being sized to allow axial longitudinal movement of the tap.

21. A device comprising a spool rotatable about an axis passing through a reel frame;

a brake element retaining structure affixed to the spool about a shaft and providing a plurality of braking elements that extend radially from the brake element retaining structure under centrifugal force, wherein the plurality of braking elements are radially arranged and longitudinally staggered;

a brake ring structure providing a braking surface that selectively engages more or fewer of the plurality of braking elements when the plurality of braking elemental radially extend depending upon the proximity of the brake ring structure to the spool;

at least one tap provided on an arm extending from the brake ring structure;

a brake dial, said brake dial exteriorly threaded and receiving the at least one tap and operable to adjust the proximity of the brake ring structure to the spool by rotation of the brake dial;

a spool cover in a fixed relationship with respect to the reel frame;

wherein the spool cover interposes the brake dial and the brake ring structure; and wherein the spool cover provides at least one cutout therein allowing the at least one tap provided by the brake ring structure to fit into the brake dial; and wherein the spool cover provides at least one boss that receives, in sliding engagement, at least one receptacle defined in at least one receptacle arm extending from the brake ring structure thereby allowing axial longitudinal movement of the brake ring structure but preventing rotational movement of the brake ring structure.

22. A device comprising a spool rotatable about an axis passing through a reel frame;

a brake element retaining structure affixed to the spool about a shaft and providing a plurality of braking elements, wherein said plurality of braking elements are radially arranged and axially longitudinally staggered and extend radially from the brake element retaining structure under centrifugal force;

a brake ring structure providing a braking surface that selectively engages more or fewer of the plurality of braking elements when the plurality of braking elements radially extend depending upon the proximity of the brake ring structure to the spool;

at least one tap provided on an arm extending from the brake ring structure;

a brake dial, said brake dial exteriorly threaded and receiving the at least one tap and operable to adjust the proximity of the brake ring structure to the spool by rotation of the brake dial;

a spool cover in a fixed relationship with respect to the reel frame;

wherein the spool cover interposes the brake dial and the brake ring structure; and wherein the spool cover provides at least one cutout therein allowing the at least one tap provided by the brake ring structure to fit into the brake dial; and wherein the spool cover provides a bearing that receives the shaft in rotational engagement.

23. A device comprising:

a spool rotatable about an axis passing through a reel frame;

a magnetic braking structure having a plurality of magnets for retarding the rotation of the spool in varying degrees depending upon the proximity of the magnetic braking structure to the spool;

at least one tap extending from the magnetic braking structure;

a brake dial, said brake dial exteriorly threaded and receiving the at least one tap and operable to adjust the proximity of the magnetic braking structure to the spool by rotation of the brake dial; and a spool cap in a fixed relationship with respect to the reel frame, the spool cap interposing the brake dial and the magnetic braking structure and defining a longitudinal opening allowing the tap to pass to the brake dial.

* * * * *